United States Patent [19]
Roberts et al.

[11] Patent Number: 6,101,486
[45] Date of Patent: Aug. 8, 2000

[54] SYSTEM AND METHOD FOR RETRIEVING CUSTOMER INFORMATION AT A TRANSACTION CENTER

[75] Inventors: Jobe L. W. Roberts, Wakefield; Patricia A. Stolte, Ottawa; Mitch A. Brisebois, Wakefield, all of Canada

[73] Assignee: Nortel Networks Corporation, Canada

[21] Appl. No.: 09/062,727

[22] Filed: Apr. 20, 1998

[51] Int. Cl.[7] .................................................. G06F 17/60
[52] U.S. Cl. ............................................... 705/27; 705/14
[58] Field of Search .............................. 370/904; 705/14, 705/26, 27; 379/267, 321, 308

[56] References Cited

U.S. PATENT DOCUMENTS

| | | | |
|---|---|---|---|
| 4,656,624 | 4/1987 | Collins et al. | 370/270 |
| 5,710,884 | 1/1998 | Dedrick | 395/200.47 |
| 5,717,923 | 2/1998 | Dedrick | 707/102 |
| 5,724,521 | 3/1998 | Dedrick | 705/26 |
| 5,826,242 | 10/1998 | Montulli | 705/27 |
| 5,835,087 | 11/1998 | Herz et al. | 345/327 |
| 5,848,396 | 12/1998 | Gerace | 705/10 |
| 5,894,554 | 4/1999 | Lowery et al. | 707/10 |
| 5,907,547 | 5/1999 | Foladare et al. | 370/352 |

OTHER PUBLICATIONS

"GuestTrack, Inc. releases enhanced Web site personalization and Web catalog software," Business Wire, Mar. 21, 1997.

"GeoCities Partners with StarPoint to Serve Millions of Personalized Ads Daily," PR Newswire, Jul. 21, 1997.

"New Software Allows Marketers To Target Web Pages," Interactive Marketing News, vol. 2, Issue 25, Dec. 08, 1995.

"Cookies—Tricks or Treats?", Steve M. Dorman, Journal of School Health, 69, 2, 82(1), Feb. 1999

"Telephony Management: Bendata's Heat Telephony Manager Integration Provides Service Organizations with Window to Incoming Customer Calls", EDGE, on & about AT&T, vol. 12, pp. 4(4), Mar. 17, 1997.

*Primary Examiner*—Eric W. Stamber
*Assistant Examiner*—Susanna Meinecke-Díaz
*Attorney, Agent, or Firm*—Finnegan, Henderson, Farabow, Garrett & Dunner, L.L.P.

[57] ABSTRACT

A method and system for gathering and storing customer profile data when the customer accesses a website location. Dynamic content messages from company marketing material are selected in accordance with the profile data and used to provide a customized webpage to the customer. In addition, a customer service representative can provide real-time updates to the customized webpage when the customer contacts a customer service representative to place a product or service order.

14 Claims, 6 Drawing Sheets

ORDER

YOUR ORDER: ~220

| | |
|---|---|
| ONE TIME FEE | |
| 1 THREE LINE TELEPHONE | $299.99 |
| 1 ENHANCED FEATURE ADAPTER | $199.99 |
| TAXES | $74.99 |
| TOTAL | $574.99 |

| | |
|---|---|
| MONTHLY CHARGE | |
| LINE 555-1234 | $16.99 |
| CALL WAITING | $3.99 |
| CALL DISPLAY | $3.99 |
| LINE 555-3417 | $16.99 |
| VISUAL CALL WAITING | $3.99 |
| CALL FORWARDING | $3.99 |
| TAXES | $7.79 |
| TOTAL | $59.73 |

220

Bell ~210

THIS IS A SECURE CONNECTION
ALL INFORMATION WILL REMAIN CONFIDENTIAL.

YOUR INFORMATION:

NAME [ ]
ADDRESS [ ]
CITY [ ]
STATE/PROV. [ ]   ZIP/CODE [ ]
PHONE [ ]
E-MAIL [ ]   FAX [ ]

CREDIT CARD
◉ AMEX  ○ MASTER CARD  ○ VISA
NUMBER [ ]   EXPIR. [ ]

PAYMENT ON MONTHLY CHARGES
◉ BILL ME  ○ CHARGE MY CREDIT CARD

YOUR CREDIT CARD
WILL BE CHARGED
$574.99

TO MAKE ANY CHARGES PRESS [RETRY]

[ ] ~232
ORDER FROM A
REPRESENTATIVE NOW

[ORDER ONLINE]
YOUR ORDER WILL BE
CONFIRMED IMMEDIATELY.

ALTERNATIVE
PURCHASE
OPTIONS:

[PRINT ORDER] ~234
TO SEND BY
REGULAR MAIL

[SAVE ORDER] ~236
TO SEND
BY MAIL

SYSTEM AND METHOD FOR RETRIEVING CUSTOMER INFORMATION AT A TRANSACTION CENTER

BACKGROUND OF THE INVENTION

The present invention relates to the field of Internet communication, and more particularly to a method and system for obtaining customer information through the customer's access to an Internet website.

The importance of the Internet continues to expand as both an information gathering tool and an electronic commerce conduit. Consumers can access various websites to gather information as casual users or target particular sites to obtain information regarding the products and services they wish to purchase. Secure data lines, encryption techniques, and other various mechanisms exist to protect those consumers wishing to make purchases over the Internet's communication pathways.

Despite these advancements, however, many of consumers still view Internet transactions and purchases with trepidation and skepticism. The reluctance to provide sensitive information and transaction security are among the biggest fears associated with electronic commerce via the Internet. Many people also feel that the risk of transmitting credit card account information is greater than the convenience such transactions provide.

Furthermore, consumers are also often uncertain as to whether an initiated purchase is actually completed. E-mail or faxed confirmation messages are used to alleviate these concerns, but in some cases confirmation is not certain until the product is received, the service is activated, or the purchase appears on the consumer's credit card statement. As such, most purchases, even those researched or initiated with the resources of the Internet, are still completed with the aid of human interaction and communication.

A person researching a product or service, for example, will likely visit a website and gather the information required to make a decision. Once the purchasing decision has been made, the customer contacts a transaction center by telephone to place an order. At the transaction center, a customer service representative (CSR) must interrogate the customer for information regarding the customer's purchase, which often results in a duplication of effort at least from the customer's standpoint. The customer has already taken the time to look through the on-line catalogue and locate the desired product or service, and in doing so the customer may have provided other, less sensitive, information to gain access to the website, such as the customer's name, affiliation, address, and e-mail address. When the customer then contacts the CSR, he or she must repeat the effort and provide this information again to complete the desired transaction.

One reason such duplication is necessary is that currently, when customers contact the transaction center, the CSR has limited access to a caller's identification information. Caller Line ID (CLID), for example, can provide the CSR with the customer's name and telephone number, but can do nothing to speed the response to a customer's particular need or purchase desires. CLID information is stored at a public telephone network, then delivered and displayed at a receiving display device when the call connection is completed. The company may also maintain a customer database to store the customer's ordering history or previous dealings with the company. When the customer calls and is identified, the CSR may access the database and view the customer's previous purchases. This feature allows a better and more complete interaction between the CSR and the customer, but would do nothing to identify the particular purchase the consumer wishes to make.

Interactive Voice Response (IVR) systems are also used by transaction centers to determine a customer's information and purchasing requirements or preferences. These systems allow screening of customer calls through a series of commands initiated on a touch-tone phone. Generally, a customer is guided through a number of instructions and asked to make selections based upon his or her particular requirements. By screening the call and routing in accordance with the results, the CSR will have a better understand of the customer's requirements. The prevalence of IVR systems and their limited capabilities, however, may be frustrating and unnecessarily time-consuming for the consumer when more direct human interaction is desired.

Therefore, it is desirable to allow a CSR greater and more readily available access to a customer's information and preferences. It is also desirable to permit a purchasing request, researched through the Internet, to be more readily acted upon when a call placing an order is received at transaction center. In addition, it is further desirable to allow the customer's information and preferences be used as a real-time customized marketing tool when the customer is in contact with the company's website. The tool would permit webpages, created in accordance to a customer's preferences, to be viewed by the customer when the company's website or related website location is visited.

SUMMARY OF THE INVENTION

Systems and methods consistent with this invention accomplish these goals and provide other advantages by automatically collecting customer profile information when the customer accesses a company's website. In addition, systems and methods consistent with this invention transmit dynamic content messages to the website when the customer is in contact with the website. The dynamic content messages are selected in accordance with the profile information to present customized webpages for display on the customer's computer terminal.

Specifically, a method for gathering customer profile data consistent with this invention includes several steps. The steps include receiving a plurality of identification data from a user in communication with a website server; storing the plurality of identification data at a transaction center in communication with the server; and retrieving the information data when the user is in voice communication with the transaction center.

Another method, consistent with this invention, for customizing a website in accordance with user profile information includes several steps. Initially, a plurality of user identification data is received and used to create a user profile. The user profile is retrieved from a profile database when a call from the user is received. Thereafter, the user profile is compared to marketing material maintained by the company and a dynamic content message is generated. A webpage is configured for display by inserting the dynamic content message into the webpage.

A system, consistent with the present invention, for providing a customized webpage to a website maintained by a server apparatus, the system including a transaction center in data communication with the server apparatus. The transaction center including a database configured to store a customer profile; a switch, coupled to a receiver, configured retrieve the customer profile from the memory device when a call is received, and configured to route the customer profile to a computer workstation. The transaction center also including a communication device, coupled to the switch, and configured to place the customer in voice communication with a customer service representative. The transaction center also including a processor in data communication with the computer workstation and configured to select a dynamic content message in accordance with data in the customer profile, and a transmitter, coupled to the computer workstation, configured to transmit the selected dynamic content message to the server apparatus.

The summary and the following detailed description should not restrict the scope of the claimed invention. Both provide examples and explanations to enable others to practice the invention.

BRIEF DESCRIPTION OF THE DRAWINGS

The accompanying drawings, which form part of the detailed description, show embodiments of the invention and, together with the description, explain the principles of the invention.

FIG. 2 is a sample screen showing the collection of customer information;

DETAILED DESCRIPTION

Figure 1:
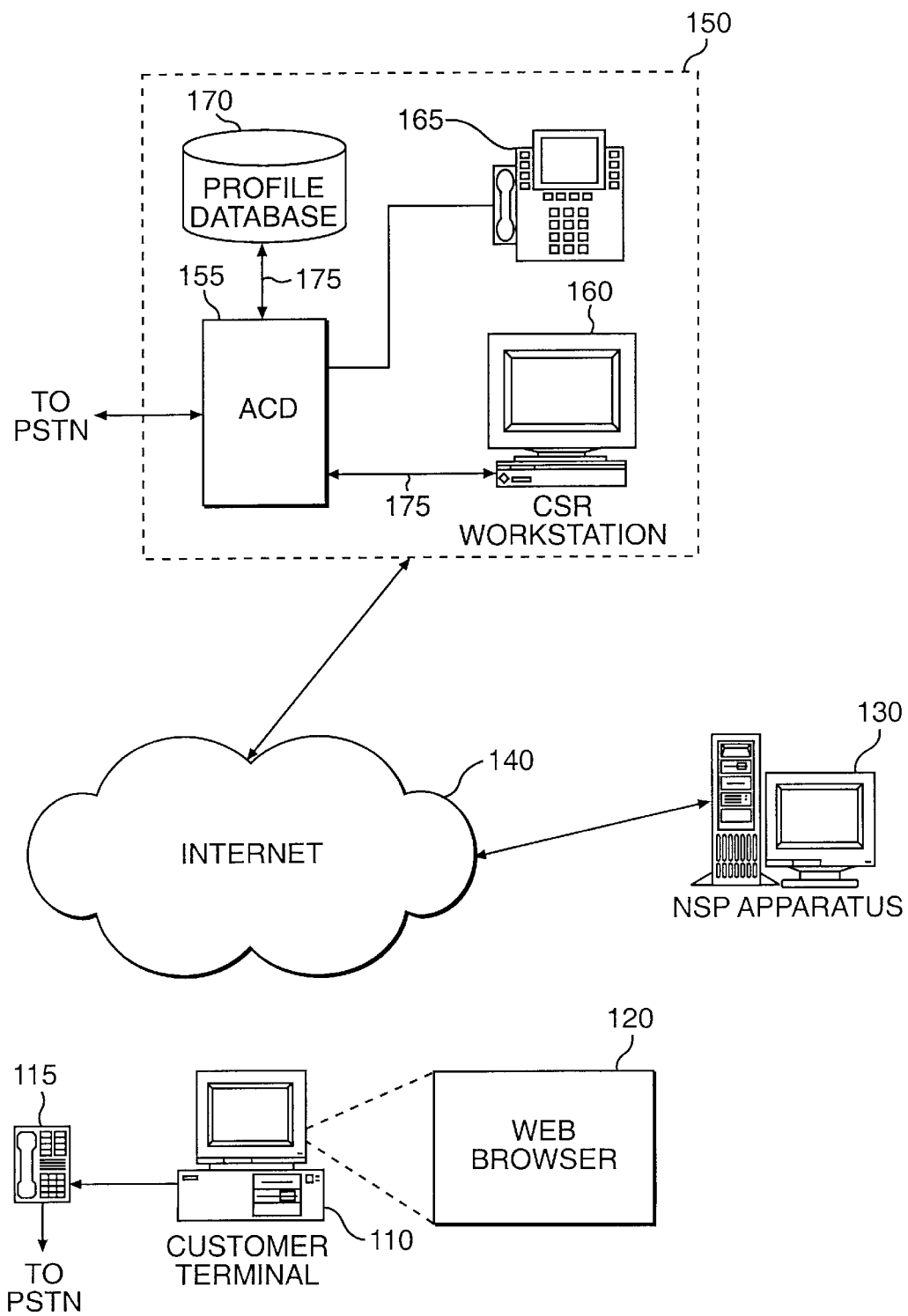
FIG. 1 is a block diagram of a communication system consistent with this invention.

Reference will now be made in detail to the preferred embodiment of the invention, an example of which is illustrated in the accompanying drawings. Where appropriate, the same reference numerals refer to the same or similar elements.

System Architecture

FIG. 1 is a block diagram communication system 100 for collecting customer profile information consistent with this invention. System 100 includes a user, or customer terminal 110, a user telephone 115, a web browser 120, a network service provider (NSP) apparatus 130, and a transaction center 150. Customer terminal 110, transaction center 150, NSP apparatus 130, and web browser 120 are each coupled to a network 140 representing the numerous information databases that comprise the Internet. While a direct communication link is shown between network 140 and the various components, those skilled in the art will recognize that each component may be in data communication to the Internet via a public service telephone network (PSTN), a wireless switching fabric, or any equivalent link. In addition, while NSP apparatus 130 is shown separately from transaction center 150, it may reside within the same physical location.

Web browser 120 preferably resides with customer terminal 110 and may be any commercially available browser device such as Internet Explorer from Microsoft, Corp. or Netscape Navigator ™ from Netscape, Inc. NSP apparatus 130 is a server apparatus preferably operated by a conventional Internet service provider (ISP) that can route search requests, provide Internet access, and maintain a company's webpage or website.

Transaction center 150 represents a customer service center for receiving product or service purchase orders. It can be located at a company warehouse, associated with a particular service center, or residing at a company's headquarters. Center 150, however, can include any facility or location that can receive and process product and service orders is consistent with the requirements of this invention. Transaction center 150 includes an Automated Call Distribution (ACD) device 155, a CSR workstation 160, a CSR telephone terminal 165, and a customer profile database 170.

ACD device 155 receives and routes customer calls to the CSR telephone terminal 165. In addition, ACD device 155 retrieves customer profile information from profile database 170 and routes the particular customer profile data to CSR workstation 160 for display via a Computer Telephony Integration (CTI) link 175. ACD device 155 is a standard call-routing apparatus such as a Meridian 1 PBX from Northern Telecom, LTD. CSR workstation 160 is a standard, off-the-shelf computer terminal with Internet access capability that serves as a link to network 140.

Database 170 is a customer profile database accessible by CSR workstation 160. Preferably, database 170 is maintained by a computing apparatus residing at the transaction center 150. Alternatively, database 170 resides in a remote location and is in data communication with the transaction center 150 through a communication link. Database 170 preferably includes an information storage apparatus or memory capable of storing, maintaining, and communicating customer profile information.

This profile information may include any number of identifying characteristics, such as a customer name, address, company affiliation, e-mail address, phone number, customer account information, fax number, etc. In addition, the customer profile information may include other useful data, such as previous purchases and a listing of products and services currently owned by the customer. The products owned may be directly entered into the profile or may be products ordered by the company, and therefore recorded or logged into the company's database. Further, the profile information includes any product selections the customer makes while visiting the website.

If, for example, the customer selects a product from an on-line catalog, the selection is logged so that the CSR will know the product researched (i.e., through the selection of websites or catalog entries) or selected by the customer's actions while visiting the website when the transaction center is contacted. Any specialized or customized features desired by the customer are also included in the profile information.

FIG. 2 shows a sample screen for gathering customer profile information consistent with this invention. The information gathering screen would preferably include an information field 210, a product ordering field 220, and a contact field 230. Identification field 210 includes a fill-in menu to input the customer's information, such as name, address, e-mail, and credit card number. Product order field 220 includes a listing of the products desired or selected by the customer's catalog selections, for example, (i.e., three-line telephone and enhanced feature adapter) and a list of the special features or services requested (i.e., call waiting, call display, visual call waiting, and call forwarding). Finally, contact field 230 includes screen buttons 232, 234, and 236 that can be selected by the customer to initiate alternative purchasing options, such e-mail orders, mail orders, or a call to a CSR.

Information Gathering

Figure 3:
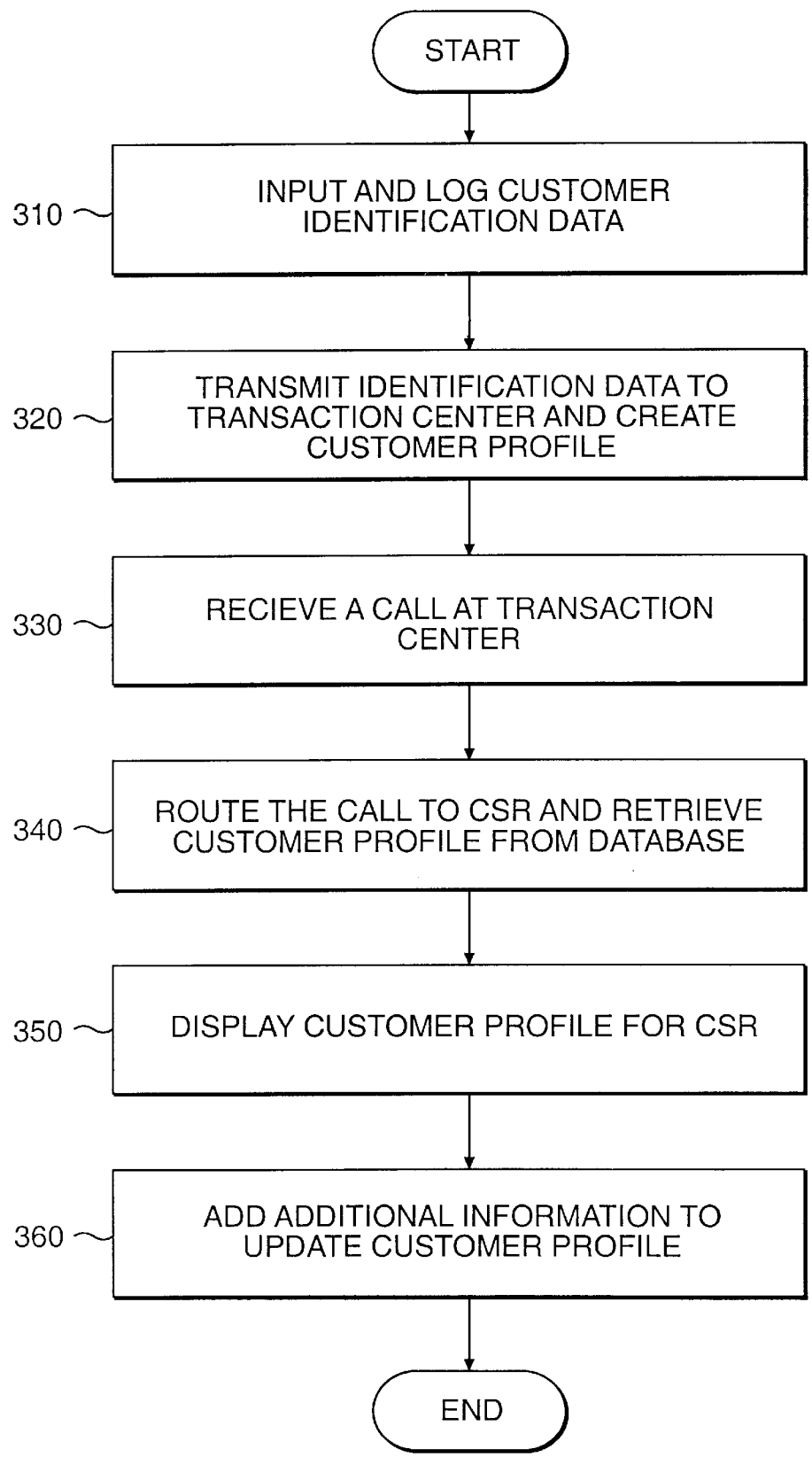
FIG. 3 is a flowchart of the major steps of a method for collecting customer profile information consistent with this invention.

FIG. 3 is a flowchart of the major steps of a method 300 for collecting customer profile information consistent with this invention. When a customer accesses a company's website via network 140 to research a product or service purchase, information identifying the particular customer and the product desired is gathered by NSP apparatus 130. As shown in FIG. 2, the collection of customer profile information may be accomplished through a number of customer initiated input operations. Keyboard entries to pull down menus and text fields, as well as, mouse clicks of multiple choice check boxes or banner selections are examples of the type of customer input operations used to supply the identification information. Voice commands input to a microphone coupled to customer terminal 110 also may be used to provide the identification information.

When the identification information is received from the user, it is logged and stored by web browser 120 (Step 310). Web browser 120 logs the customer's input operations using a "cookie" or other information logging techniques that are known by those skilled in the art. In addition to the active input operations described above, the cookie may log the customer's passive activity (i.e., time spent viewing a particular webpage, entry through a particular banner, etc.) to gather information about the customer's interest.

This logged information is transmitted to transaction center 150 via NSP apparatus 130 and used to create a new or update an existing customer profile stored in customer profile database 170 (step 320). The customer terminal may be an off-the-shelf computer, set-top box with Internet access, or a television with Internet access. Customer terminal 110 preferably includes a modem or like data communication device for transmitting the information and allowing the customer to access the Internet. Next, preferably while in data communication with the company's website, the customer initiates a call that is received by transaction center 150 (Step 330). The call may be an Internet Protocol (IP) call placed by selecting a button displayed on the viewed webpage, or a standard telephone call initiated by dialing transaction center 150 with telephone 115.

Upon receiving the call, ACD device 155 routes the call to CSR telephone terminal 165, thereby placing the customer and CSR in voice communication with one another. The voice communication may be accomplished over a standard, wireless, or IP telephone link. In addition to routing the call, ACD device 155 uses associated identifying data included with the call to retrieve the customer profile from profile database 170 via CTI communication line 175 (step 340). Preferably, the incoming phone number is sufficient to identify the customer and retrieve the customer's profile. Other information such as CLID information could also be used to identify the customer initiating the call. Once retrieved, the customer profile is displayed for the CSR on CSR workstation 160 (Step 350).

With this information the CSR has knowledge of the customer's desired product order and identification information. The customer, for example, may have selected a product and requested a particular setting or customized feature. The profile gives the CSR knowledge of the customer's particular desires once the profile is viewed. The CSR may update the profile with additional information while in voice communication with the customer (Step 360). The customer, to a limited degree, may also update the profile to change product settings or to activate and deactivate services.

The additional information used by the CSR may include facts not derived from the initial information collection, but gleaned from the customer's telephone interaction with the CSR. A questionnaire or survey, for example, would allow the CSR gain insight into a customer's particular interest or attribute characteristics. The information obtained from the survey could include the customer's personal interest such as desired vacation destinations, frequency of business travel, the customer's demeanor, desired product and service settings, etc. The survey could be conducted by the CSR or filled in by the customer when the website is visited. Once obtained, the additional information is added to the profile and used to better service the customer in the future.

Customized Webpage Generation

Figure 4:
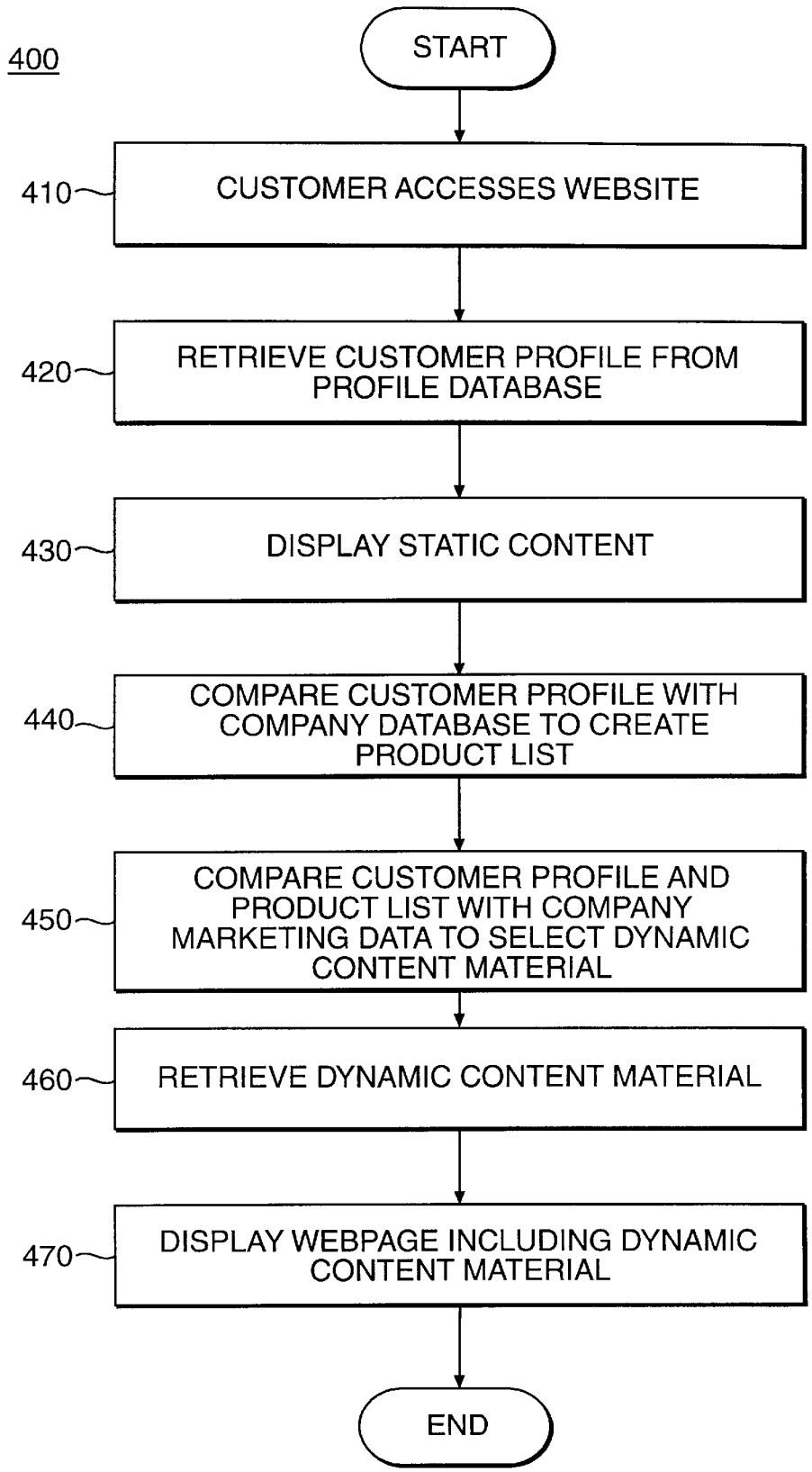
FIG. 4 is a flowchart of the major steps of a method for providing customize information messages in accordance with a customer profile consistent with this invention.

Customized marketing messages and advertisement banners included in the company's website are examples of how the profile information may be used to better serve the specific needs or interests of each customer. FIG. 4 is a flowchart illustrating a method 400 for providing customized information messages consistent with this invention. Once the profile is stored in profile database 170, it is used to create a webpage for view by the customer.

When the customer contacts (i.e., visits or accesses) the company website (Step 410), the customer profile is retrieved from profile database 170 by ACD device 155 (Step 420). Webpages of the company's site displayed on customer terminal 110 will include both static and dynamic material. The static material acts as a template for the displayed webpage image and includes, for example javascripts™, CGI scripts, JAVA™ applets, etc. These scripts have instructions for retrieving various dynamic content messages and displaying them on customer terminal 110 when the customer is viewing the company's website. To display the webpages on customer terminal 110, web browser 120 retrieves the static content (i.e., the website template) from NSP apparatus 130 and displays it on customer terminal 110 (Step 430).

To customize the website, the dynamic content messages are selected by comparing the customer profile with information within a company database. The company database contains a listing of the products and services offered by the company, related affiliations, or clients. In addition, the company database includes marketing information such as messages, new stories, specifications, etc., that relate to the products or services offered.

A comparison between the customer profile and the company database is performed to create a listing of products or services not currently owned or used by the customer (Step 440). Preferably, the customer profile includes a listing of services and products currently possessed by the customer. This first comparison generates a product list that includes products within the company's database that are not currently owned by the customer and of potential interest to the customer. Any information or advertisement for previously purchased products would be a duplication, and therefore of little use to the customer. Likewise, if a customer has already purchased a particular product from the company, the comparison would identify products and services that could operate in conjunction with, or offer improvements over, the customer's current inventory of products and services.

After the first comparison, the customer profile information and the product list are compared to marketing data within the company database. (Step 440). A comparison of these items identifies dynamic content messages in the marketing database of potential interest to the customer. Again, the customer's particular interests are obtained from the customer profile information previously gathered. The profile information would keep track of certain attitudes, interests, or preference attributes. For instance, customer that are eager to try new products and services may be distinguished from those that are more conservative in their willingness to experiment. The profile information is used, for example, to place the customer on a technology gradient that identifies their willingness to try new technology. The product or service may be specifically identified as "leading-edge" or "common-place and popular" depending upon the customer's gradient level and determined preference type.

Marketing messages may also be tailored along other scales or gradients derived from the profile. If, for example, a customer clicks rapidly through webpages, the marketing messages selected would be short and to the point. Another customer spending a lot a time on a particular webpage may receive a longer and more detailed message. Again, the information reflected in the profile determines the type of message selected.

After the second comparison, the selected dynamic content messages are retrieved from NSP apparatus 130 (Step 460). The comparisons are performed by commands from the CSR to CSR workstation 160 or automatically by processor or server apparatus responsible for maintaining the marketing database. In addition, by operating as the company's web server, NSP apparatus 130 could have access to the company database, and therefore retrieve the marketing data that comprises the dynamic content messages for the customized webpage. The CGI scripts, javascripts™ or JAVA™ applets transmitted with the static content include commands for continually retrieving dynamic information from NSP apparatus 130. Finally, the customized webpage including the dynamic content messages is displayed on customer terminal 110 (Step 470).

Figure 5:
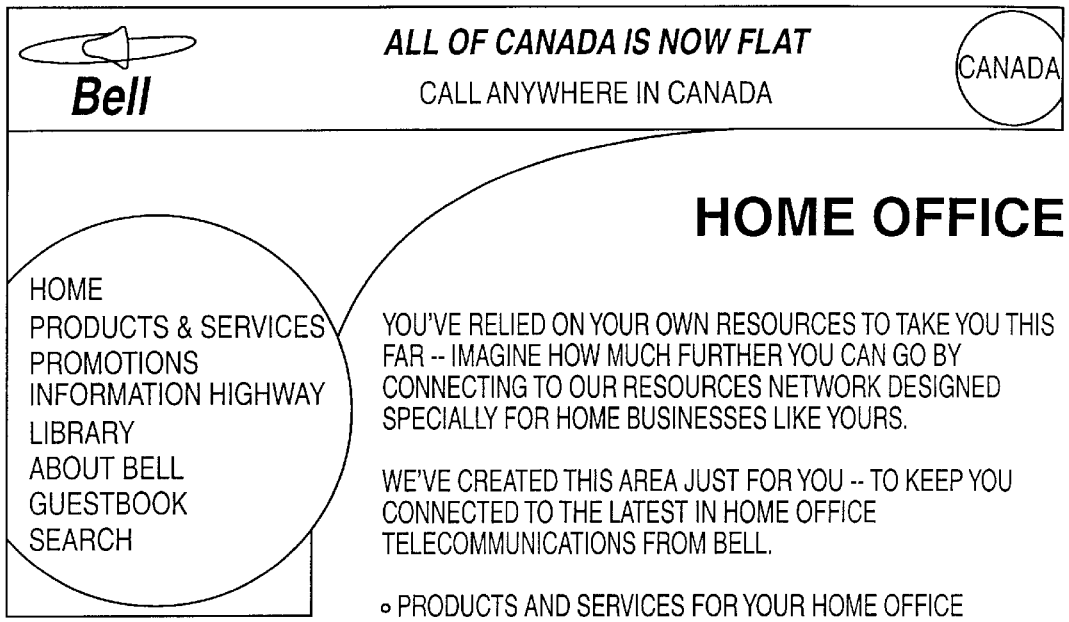
FIG. 5 is a sample screen showing a webpage including static and dynamic content consistent with this invention.

FIG. 5 is a sample screen showing a company webpage of static and dynamic content consistent with this invention. The dynamic content messages are represented by articles label 510, 520, 530, and 540. Static content includes the remaining items and template structure of the webpage.

While the embodiment shown in FIG. 4 depicts a method for supplying static and dynamic content messages when the company website is revisited, identification information from first-time visitors can be stored and used to create the customer profile and subsequent customized webpages. In addition, the static material and dynamic content messages could be supplied to the website and displayed on customer terminal 110 when the CSR is in voice communication with the customer.

Based on interaction with the customer, the CSR could select or "cue-up" webpages for the customer to review, either as they are speaking to the CSR or at a later time. To accomplish this feature, the CSR inserts a Universal Resource Locator (URL) bookmark into a special section of the customer's profile. The URL bookmark is read by web browser 120, inserted into the script corresponding to the static content template, and displayed on customer terminal 110. The customer would view the cued webpage by selecting the bookmark with a mouse or keyboard input.

Figure 6:
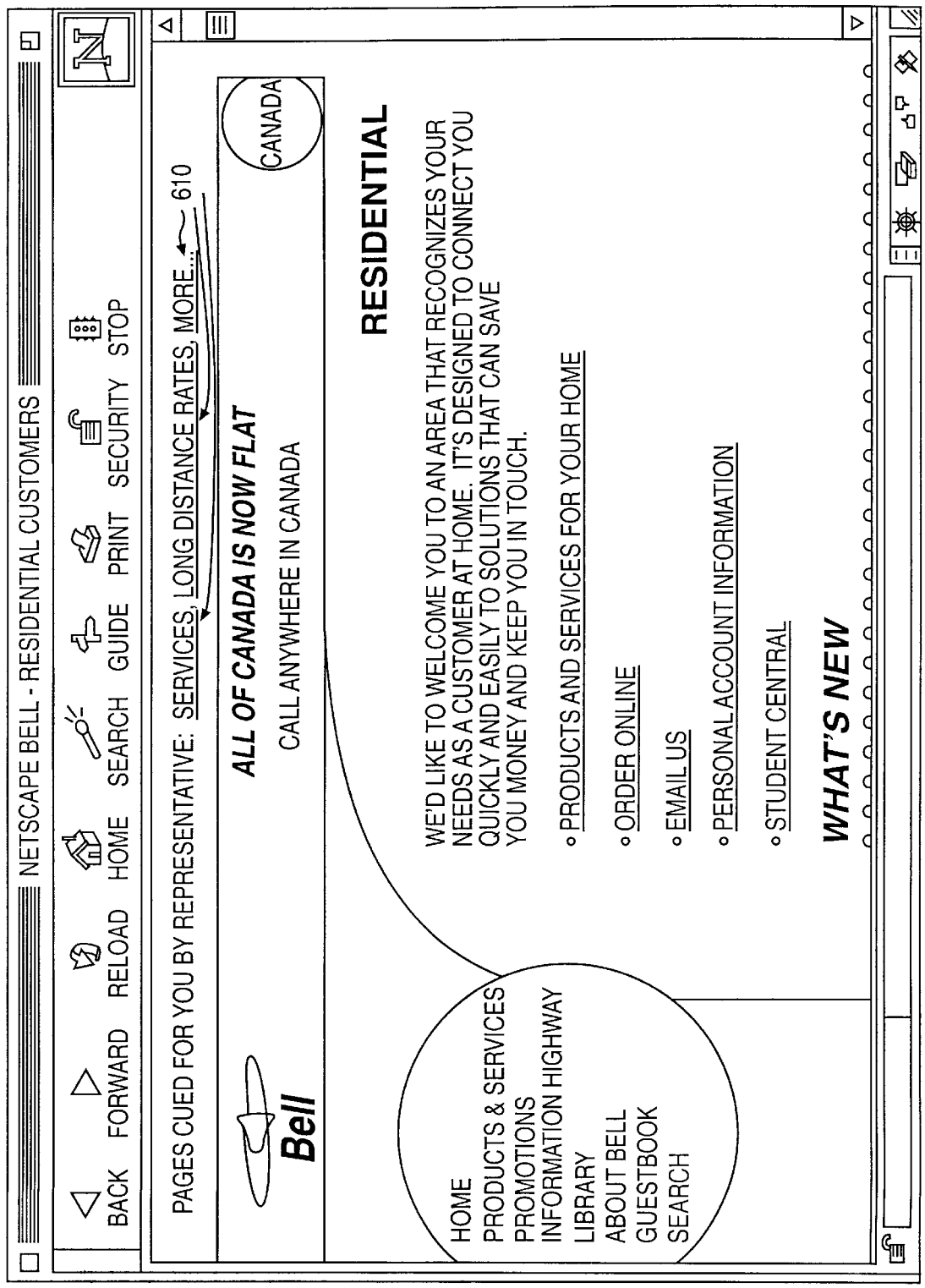
FIG. 6 is a sample screen showing a webpage including bookmarks inserted by a customer service representative consistent with this invention.

FIG. 6 is a sample screen showing a webpage including bookmarks inserted by a customer service representative consistent with this invention. In FIG. 6, bookmarks 610 represent the URL bookmark selected and inserted by the CSR. Once accessed, the URL could be automatically deleted or deleted after a set time.

Conclusion

Systems and methods consistent with this invention provide for the gathering and storage of customer profile data, thereby allowing better customer service to be achieved. The profile data is used to select dynamic content messages that can be displayed for the customer via the company's website. Those skilled in the art will recognize that various modifications and variations can be made in the preceding examples without departing from the scope or spirit of the invention.

The specification does not limit the invention. Instead it provides examples and explanations to allow persons of ordinary skill to appreciate different ways to practice this invention. The following claims define the true scope and spirit of the invention.

What is claimed is:

1. A system for customizing a website in accordance with user profile information the system having a transaction center, the transaction center comprising:
   means for receiving a plurality of user identification data;
   means for creating a user profile corresponding to the plurality of user identification data received, wherein the user profile includes a list of products by the user;
   means for retrieving the user profile from a profile database;
   means for selecting a number of messages from the plurality of company marketing material;
   means for generating a dynamic content message by comparing the list of products owned with a plurality of company marketing material having a list of company products to create a marked product list corresponding to products offered by the company and not in the user profile; and
   means for configuring a webpage to include the dynamic content message; and
   means for displaying the user profile on a customer service terminal.

2. The system of claim 1, wherein the profile database resides at a transaction center, and wherein the means for retrieving includes
   means, at the transaction center, for receiving a call and associated identifying information from the user;
   means for routing the call to place the user in voice communication with a communication device; and
   means for retrieving the user profile from the profile database in accordance with the identifying information.

3. The system of claim 2, wherein the user profile includes a plurality of preference attributes, and wherein the means for selecting includes
   means for grading the plurality of preference attributes to determine a customer preference type; and
   means for selecting the marketing messages in accordance with the determined customer preference type.

4. The system of claim 3, wherein the means for configuring the webpage further includes
   means for transmitting a script to a web browser;
   means for retrieving the dynamic content message from a server in data communication with the web browser, wherein the retrieved dynamic content message corresponds to the selected marketing messages;
   means for inserting the dynamic content message into a webpage template generated by the script; and
   means for configuring the webpage template and inserted dynamic content message for display on a user terminal.

5. The method of claim 4, wherein the means for configuring the webpage template and inserted dynamic content message further includes means for inserting a bookmark corresponding to a website selected by the customer service representative into the template.

6. In a system for providing a customized webpage to a website maintained by a server apparatus, the system including a transaction center in data communication with the server apparatus, the transaction center comprising:

a database configured to store a customer profile;

a switch, coupled to a receiver, configured to retrieve the customer profile from the database when a call is received, and to route the customer profile to a computer workstation;

a communication device, coupled to the switch, and configured to place the customer in voice communication with a customer service representative;

a processor in data communication with the computer workstation and configured to select a dynamic content message in accordance with the customer profile, the processor further including means for storing a plurality of marketing material having a list of products offered by the company;

means for comparing a list of products owned by the customer to the list of products offered to create a marketed product list corresponding to products offered by the company and not in the customer profile;

means for comparing the user profile and the marketed product list to the plurality of marketing material; and means for selecting a number of messages from the plurality of marketing material; and a transmitter coupled to the computer workstation and configured to transmit the selected dynamic content message to the server apparatus.

7. The system of claim 6 further including a customer terminal in data communication with the server apparatus including, the customer terminal an input device configured to input user identification information in accordance with a user action;

a web browser stored in the customer terminal configured to receive the identification information from the input device; and a transmitter configured to place the web browser in data communication with the server.

8. The system of claim 6, wherein the customer profile includes a plurality of customer preference attributes, and wherein the means for selecting includes means for grading the plurality of preference attributes to determine a customer preference type; and means for selecting the marketing messages in accordance with the determined customer preference type.

9. The system of claim 8, wherein the transaction center further includes means for configuring a webpage template for display; and means for inserting a bookmark corresponding to a website into the template.

10. A method for customizing a website in accordance with user profile information comprising the steps of:

receiving a plurality of user identification data;

creating a user profile corresponding to the plurality of user identification data received, wherein the user profile includes a list of products owned by the user;

retrieving the user profile from a profile database;

selecting a number of messages from the plurality of company marketing material;

generating a dynamic content message by comparing the list of products owned with a plurality of company marketing material having a list of company products to create a marketed product list corresponding to products offered by the company and not in the user profile;

configuring a webpage to include the dynamic content message; and displaying the user profile on a customer service terminal.

11. The method of claim 10, wherein the profile database resides at a transaction center, and wherein the step of retrieving includes the substeps of receiving, at the transaction center, a call and associated identifying information from the user;

routing the call to place the user in voice communication with the communication device; and retrieving the user profile from the profile database in accordance with the identifying information.

12. The method of claim 11, wherein the step of configuring the webpage includes the substeps of transmitting a script to a web browser;

retrieving the dynamic content message from a server in data communication with the web browser;

inserting the dynamic content message into a webpage template generated by the script; and configuring the webpage template and inserted dynamic content message for display.

13. The method of claim 12, wherein the step of configuring the webpage template and inserted dynamic content message further includes the substep of inserting a bookmark corresponding to a website selected by the customer service representative into the template.

14. The method of claim 13, further including the step of displaying the webpage on a user terminal display.

* * * * *